United States Patent
Burnside et al.

(10) Patent No.: US 12,150,563 B2
(45) Date of Patent: Nov. 26, 2024

(54) RFID TAG CARRIER FOR PUSHER TYPE DISPENSING SHELF

(71) Applicant: DJB Group LLC, Dublin, OH (US)

(72) Inventors: Walter D. Burnside, Dublin, OH (US); Jeffrey J. Burnside, Galloway, OH (US); Wei-Feng Tsai, Dublin, OH (US)

(73) Assignee: DJB GROUP LLC, Dublin, OH (US)

( * ) Notice: Subject to any disclaimer, the term of this patent is extended or adjusted under 35 U.S.C. 154(b) by 0 days.

(21) Appl. No.: 18/172,678

(22) Filed: Feb. 22, 2023

(65) Prior Publication Data

US 2024/0277160 A1  Aug. 22, 2024

(51) Int. Cl.
  G06K 19/073 (2006.01)
  A47F 1/12 (2006.01)
  G06K 19/07 (2006.01)

(52) U.S. Cl.
  CPC .......... *A47F 1/126* (2013.01); *G06K 19/0723* (2013.01); *G06K 19/07309* (2013.01)

(58) Field of Classification Search
  CPC .................................................... G06K 19/0723
  USPC .......................................................... 235/385
  See application file for complete search history.

(56) References Cited

U.S. PATENT DOCUMENTS

| 8,695,878 B2 | 4/2014 | Burnside et al. |
| 9,569,747 B2 | 2/2017 | Burnside et al. |
| 2014/0110481 A1* | 4/2014 | Burnside .............. G07G 1/0054 235/492 |

* cited by examiner

*Primary Examiner* — Rafferty D Kelly
(74) *Attorney, Agent, or Firm* — Pearne & Gordon LLP

(57) ABSTRACT

The combination of a pusher dispenser having a coil spring resiliently urging a plate towards a front of the dispenser, a track for guiding the plate, a bottom surface along the track, and an electrically non-conductive insert supported by the bottom surface and having a length, a plurality of RFID tags attached to the insert along its length, the insert supporting the RFID tags at a level adjacent and below an extension of the coil spring whereby an extension of the coil spring is effective to shield the RFID tags from a reader.

2 Claims, 2 Drawing Sheets

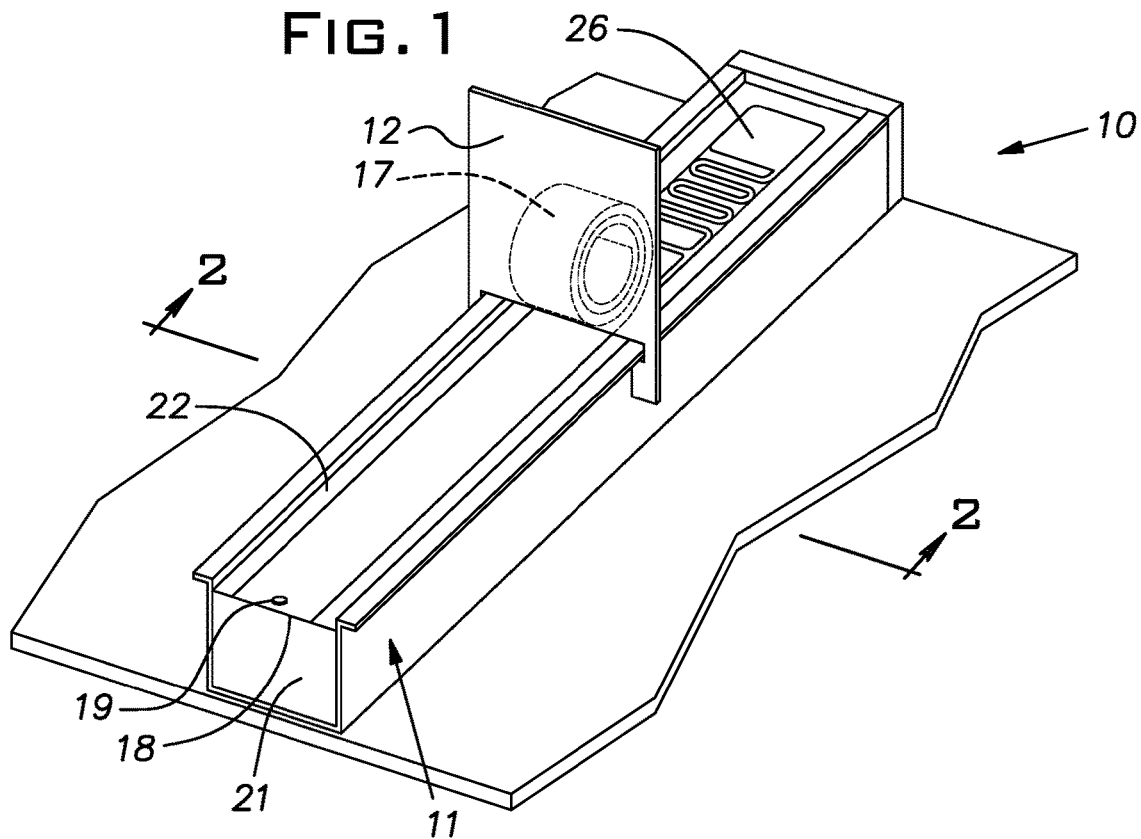
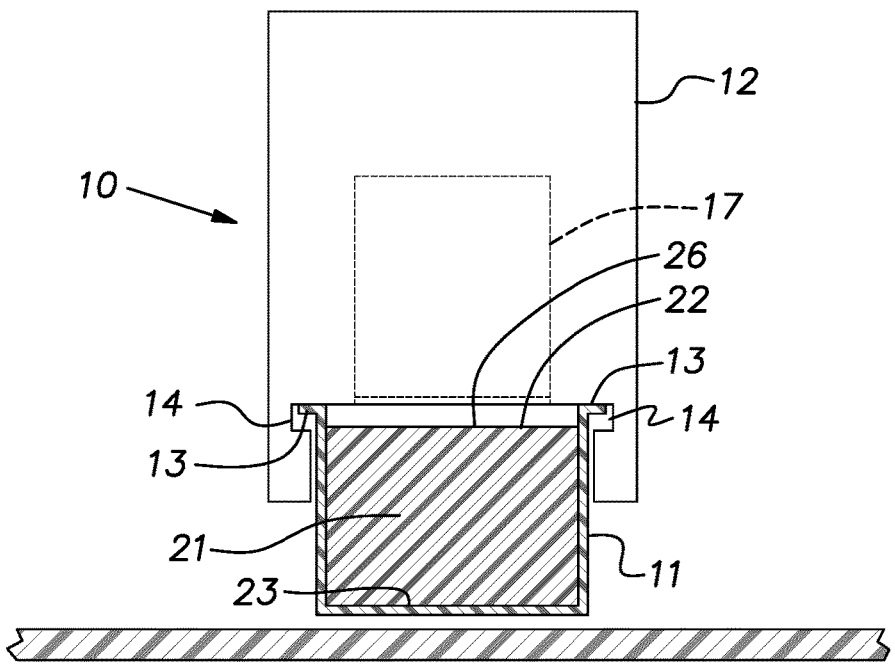

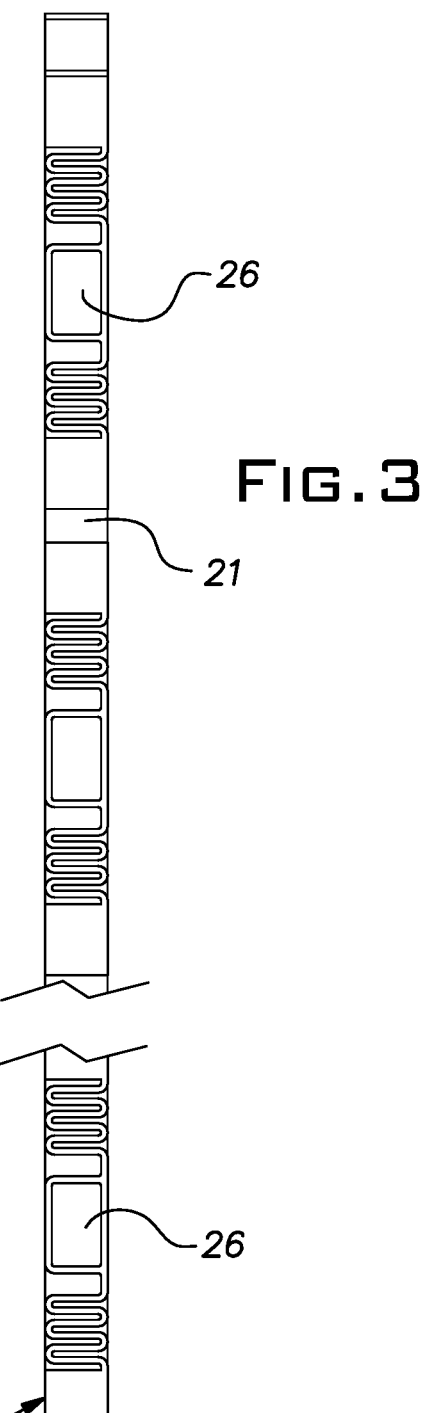
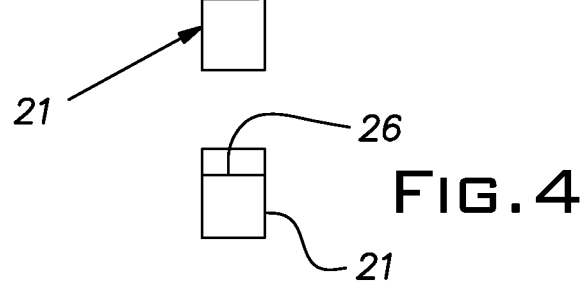

RFID TAG CARRIER FOR PUSHER TYPE DISPENSING SHELF

BACKGROUND OF THE INVENTION

The invention relates to improvements in pusher type retail shelving.

PRIOR ART

U.S. Pat. No. 8,695,878 discloses a flat metal spring coil operated pusher for a retail shelf having RFID tags beneath the path of the coil. A pusher associated with the coil pushes a line of retail products where a front item is removed. The RFID tags are progressively uncovered along the path, enabling them to be read by a nearby reader.

Pusher systems are manufactured by numerous entities and are commonly found in retail, grocery, and convenience stores. Each manufacturer of a pusher system has its own design or designs. Some existing pusher designs use an integral shelf floor beneath the coil spring that is too far from the level of the unwound spring to enable the spring to shield RFID tags mounted on the integral floor from being detected by a reader rendering the patented RFID system inoperative. There exists a need for instrumentalities that can adopt the concept of the foregoing patent to existing pusher designs including those already in retail use. Ideally, the solution would be easy to install with minimal training or physical skill.

SUMMARY OF THE INVENTION

The invention provides an elongated carrier or insert on which is mounted a linear array of RFID tags to be used in a pusher style shelf dispenser. Preferably, the carrier with the RFID tags is sufficiently rigid to be shelf-supporting so as to facilitate installation in a pusher unit. In the disclosed embodiment, the carrier has a rectangular cross-section with a width providing a snug fit with a style pusher dispenser with which it is intended to be used.

The carrier is particularly useful in pusher dispensers that cannot directly support RFID tags at a level where they are effectively shielded by an unwound length of the pusher coil spring. Additionally, even in pusher designs not subject to shielding problems the carrier can be useful for installing RFID tags, particularly in the field, such as at a store, since they afford convenience to install properly oriented and spaced tags. The carrier or insert may be made of a dielectric material that effectively enlarges the electrical size of the RFID tags allowing smaller tags to be used for better resolution.

BRIEF DESCRIPTION OF THE DRAWING

FIG. 1 is a somewhat schematic fragmentary depiction of a pusher of a dispensing shelf;

FIG. 2 is a cross-sectional view of the pusher of FIG. 1, taken in the vertical plane indicated at 2-2;

FIG. 3 is a plan view of one form of the inventive carrier; and

FIG. 4 is an end view of the carrier of FIG. 3.

DESCRIPTION OF THE PREFERRED EMBODIMENTS

There is shown a pusher dispenser 10, hereafter a "pusher". Several pushers 10 can be provided side-by-side, on a single cartridge or frame. Sidewalls, not shown, can be provided on opposite longitudinal sides of the pusher 10 to confine identical packages to a straight path. A longitudinal central track 11 having a generally U-shaped cross-section supports and guides a plate 12 along the length of the pusher 10. The track 11 has flanges 13 at the free upper ends of its sides that are engaged with notches 14 in the plate 12 so that the track guides the plate in movement along the track and maintains the plate in a vertical orientation. A coil spring 17 made of flat steel spring stock and sometimes known as a constant force spring is attached to the back of the plate 12. An end 18 of the coil 17 is fixed to the front of the pusher 10 at 19 so that the coil resiliently biases the plate 12 to the front of the pusher. In FIG. 1, license has been taken in showing the plate 12 between ends of the track 11 but it would only be in this static position if held back by a row of retail items in front of it.

An elongated, straight, non-conductive, e.g. plastic insert or carrier 21 of solid rectangular cross-section extends the length of the central track 11. The width of the insert 21 preferably provides a friction fit in the track 11. The insert 21, for low volume applications, can be 3-D printed. The height of the insert 21 when seated against the bottom, designated 23, of the track 11 presents its upper face, designated 22, at a plane slightly below, e.g. $1/16$ to $1/8$ inch, a lower face of the extended coil spring 17. Laminated to the insert upper face 22 is a linear array of RFID tags 26 extending along the full length of the insert 21. The insert height is great enough to allow the extension of the coil spring 17 to shield the RFID tags from an adjacent RFID reader.

The number of tags 26 shielded from the adjacent RFID tag reader will depend upon the position of the plate 12 which, as is known, is dependent on the number of retail product packages in front of the plate.

The RFID tag enabled pusher 10 permits a retailer to maintain real time inventory of products on the pusher since the number and/or identity of the unshielded tags can be recorded by the reader practically instantly. Loss prevention is afforded by the pusher 10 since a large number of unshielded tags appearing at once is an indication of attempted theft.

Styles of pushers other than that disclosed above can benefit from the use of a self-supporting insert and tag assembly since the insert carries the tags in alignment and proper spacing. The insert and tag assembly can be deemed self-supporting if held horizontally at one end, in cantilever fashion, the opposite free end droops less than 30 degrees.

From the foregoing, it will be understood that the process of RFID tag applications is significantly simplified saving time and requisite skill. 3-D printing of the insert makes the invention adaptable to a wide variety of shelf pusher configurations. The RFID tags can be installed remotely on an insert or carrier in preparation for installation at the retail level thereby greatly reducing business disruption. The invention is efficiently retrofitted into existing pushers thereby eliminating the need to replace existing pushers, therefore greatly reducing the total cost of a system and thus improving return on investment.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. The combination of a pusher dispenser having a coil spring resiliently urging a plate towards a front of the dispenser, a track for guiding the plate, a bottom surface along the track, and an electrically non-conductive insert supported by the bottom surface and having a length, the length of the insert being at least twice the width of the insert, a plurality of RFID tags attached to the insert along its length, the insert having a width not substantially greater than the RFID tags, the insert supporting the RFID tags at a level adjacent and below an extension of the coil spring whereby an extension of the coil spring is effective to shield the RFID tags from a reader.

2. An insert of plastic material being substantially longer than its cross-section dimensions such that the length of the insert is at least twice the width of the insert, the plastic material having at least one flat face extending along the length, a plurality of RFID tags fixed on the flat face in a linear array.

* * * * *